(12) United States Patent
Green et al.

(10) Patent No.: US 6,902,592 B2
(45) Date of Patent: Jun. 7, 2005

(54) APPARATUS AND METHOD FOR CLEANING AN AIR FILTER UNIT

(75) Inventors: Thomas B. Green, Liberty Township, OH (US); Christopher S. Swain, Cleves, OH (US); Alan W. Ball, Loveland, OH (US)

(73) Assignee: United Air Specialists, Inc., Cincinnati, OH (US)

( * ) Notice: Subject to any disclaimer, the term of this patent is extended or adjusted under 35 U.S.C. 154(b) by 81 days.

(21) Appl. No.: 10/280,805

(22) Filed: Oct. 25, 2002

(65) Prior Publication Data

US 2004/0079231 A1 Apr. 29, 2004

(51) Int. Cl.[7] .............................................. B01D 46/02
(52) U.S. Cl. ......................... 55/302; 55/283; 55/341.1; 55/293; 95/279; 95/280; 95/281; 96/233; 96/428
(58) Field of Search ........................ 55/283, 302, 341.1, 55/293; 95/280, 281, 279; 96/233, 428

(56) References Cited

U.S. PATENT DOCUMENTS

| | | | | |
|---|---|---|---|---|
| 3,683,595 A | * | 8/1972 | Houghton et al. | 55/302 |
| 3,874,857 A | * | 4/1975 | Hunt et al. | 55/302 |
| 4,253,856 A | * | 3/1981 | Paucha | 55/302 |
| 4,578,092 A | * | 3/1986 | Klimczak | 55/302 |
| 4,789,387 A | * | 12/1988 | Nemesi et al. | 55/302 |
| 5,002,594 A | * | 3/1991 | Merritt | 55/302 |
| 5,562,746 A | | 10/1996 | Raether | |
| 5,616,171 A | * | 4/1997 | Barris et al. | 95/280 |
| 6,022,388 A | * | 2/2000 | Andersson et al. | 95/280 |
| 6,090,173 A | | 7/2000 | Johnson et al. | |
| 6,129,852 A | * | 10/2000 | Elliott et al. | 55/302 |
| 6,149,716 A | * | 11/2000 | Bach et al. | 95/280 |
| 6,302,931 B1 | | 10/2001 | Min | |
| 6,309,447 B1 | | 10/2001 | Felix | |
| 6,332,902 B1 | | 12/2001 | Simonsen et al. | |
| 6,364,921 B1 | | 4/2002 | Raether et al. | |
| 6,432,153 B1 | | 8/2002 | Richard | |

* cited by examiner

*Primary Examiner*—Minh-Chau T. Pham
(74) *Attorney, Agent, or Firm*—Greenebaum Doll & McDonald PLLC; Glenn D. Bellamy; Alexander P. Brackett

(57) ABSTRACT

Shown is an apparatus and method for cleaning filter units of an air filtering system using a reverse flow pulse of pressurized air. The filter cleaning system includes a venturi element (36) with a narrowed throat portion (56). A blowpipe (46) is substantially axially aligned with the venturi (36) and has an outlet nozzle (50) that is flared in a substantially conical shape with an included angle that (64) that exceeds an angle at (62) at which high pressure air would ordinarily diverge from an unmodified blowpipe opening. The nozzle (50) is axially spaced from the venturi at a selected distance (70) such that a high velocity pulse of air delivered by the blowpipe (46) through the nozzle (50) is delivered to the outlet portion (58) of the venturi (36) substantially between the outlet opening (62) and the throat (56). This relationship provides a cleaning pulse of air that effectively completely chokes all forward movement of air flow through the venturi (36) and delivers a pulse wave of high pressure, high velocity air along substantially the full length of the tubular filter element (22).

15 Claims, 6 Drawing Sheets

APPARATUS AND METHOD FOR CLEANING AN AIR FILTER UNIT

TECHNICAL FIELD

This invention relates to a method and device for cleaning filter units of an air filtering system using reverse flow pulsed jets of pressurized air.

BACKGROUND OF THE INVENTION

Many industries encounter a problem with particulate matter suspended in a gas, such as air. In some situations, the particulate matter is a valuable product to be recovered. In other situations, the particulate matter is simply a pollutant to be removed prior to discharge or recirculation.

Systems for cleaning an air or gas stream laden with particular matter include air filter assemblies that have filter elements situated in a housing. The filter element may be a bag made of suitable fabric or a rigid media such as pleated paper. Cleaning of the filter element(s) may be accomplished by periodically pulsing a brief jet of pressurized air in a reverse flow through the filter element. Such air filter assemblies are disclosed in, for example, U.S. Pat. No. 6,090,173 (Johnson, et al.) and U.S. Pat. No. 5,562,746 (Raether).

Several challenges are inherent in designing such a device. First, the reverse flow cleaning system must not overly interfere with or compromise the forward flow of air through the filter media such that maximum efficiency may be achieved. Second, the pulse of reverse flow air needs to affect cleaning of substantially the entire length of the filter media, as evenly as possible, in order to again maximize efficiency of the air filtration process and the filter media cleaning process. Third, it is desirable to design the reverse flow pulse delivery system to operate as efficiently as possible while (effective with low energy input) achieving the first two goals.

Prior art systems have used a venturi at the air flow exit of a tubular filter element in order to recover some of the high pressure drop (or pressure differential) that occurs between dirty air and clean air chambers in the system. Pulse-jet cleaning systems utilize very short bursts of very high velocity (supersonic) air which results in the generation of significant noise as the reverse flow cleaning system is operated. The present invention provides the combination of a venturi design, blowpipe nozzle, and selected spacing therebetween in order to maximize the cleaning effect on the filter media.

SUMMARY OF THE INVENTION

The present invention provides an improved method and device for efficiently cleaning filter units of an air filtering system using reverse flow pulsed jets of pressurized air.

The air filter assembly includes a housing having an air inlet and an air outlet. The housing also includes a wall separating the housing into a filtering chamber and a clean air chamber. The separating wall includes at least one air flow aperture therethrough. An elongated substantially tubular filter element is positioned in air flow communication with the air flow aperture at an end of the filter element. The filter element includes filter media and has an inner dimension defining an inner chamber which is oriented to be in communication with the air flow aperture.

The reverse flow cleaning system of the present invention provides a venturi element having an inlet portion, an outlet portion, and a narrowed throat portion there between. The inlet portion has an opening substantially corresponding in size with the inner dimension of the filter element and is positioned on the housing wall to project into the clean air chamber. A blowpipe, which is substantially axially aligned with the outlet of the venturi, selectively delivers a reverse direction pulse of air. The blowpipe has an outlet nozzle that is flared in a substantially conical shape and has an included angle that exceeds an angle at which high pressure air would ordinarily diverge from an unmodified blowpipe opening. The nozzle is axially spaced from the venturi at a selected distance such that a high velocity pulse of air delivered by the blowpipe through the nozzle is delivered to the outlet portion of the venturi substantially between the outlet opening and the throat to effectively completely choke all forward movement of air flow through the venturi and to deliver a pulse wave of high pressure, high velocity air along substantially the full length of the filter element.

In preferred form, the reverse direction pulse of air is released from at between approximately 85 psi to approximately 150 psi and has a duration of about 100 msec.

Other aspects and features of the present invention will be noted upon examination of the drawings, description of the best mode for carrying out the invention, and claims, all of which constitute disclosure of the present invention.

BRIEF DESCRIPTION OF THE DRAWING

Like-reference numerals are used to represent like parts throughout the various figures of the drawing wherein.

BEST MODE FOR CARRYING OUT THE INVENTION

Figure 1:
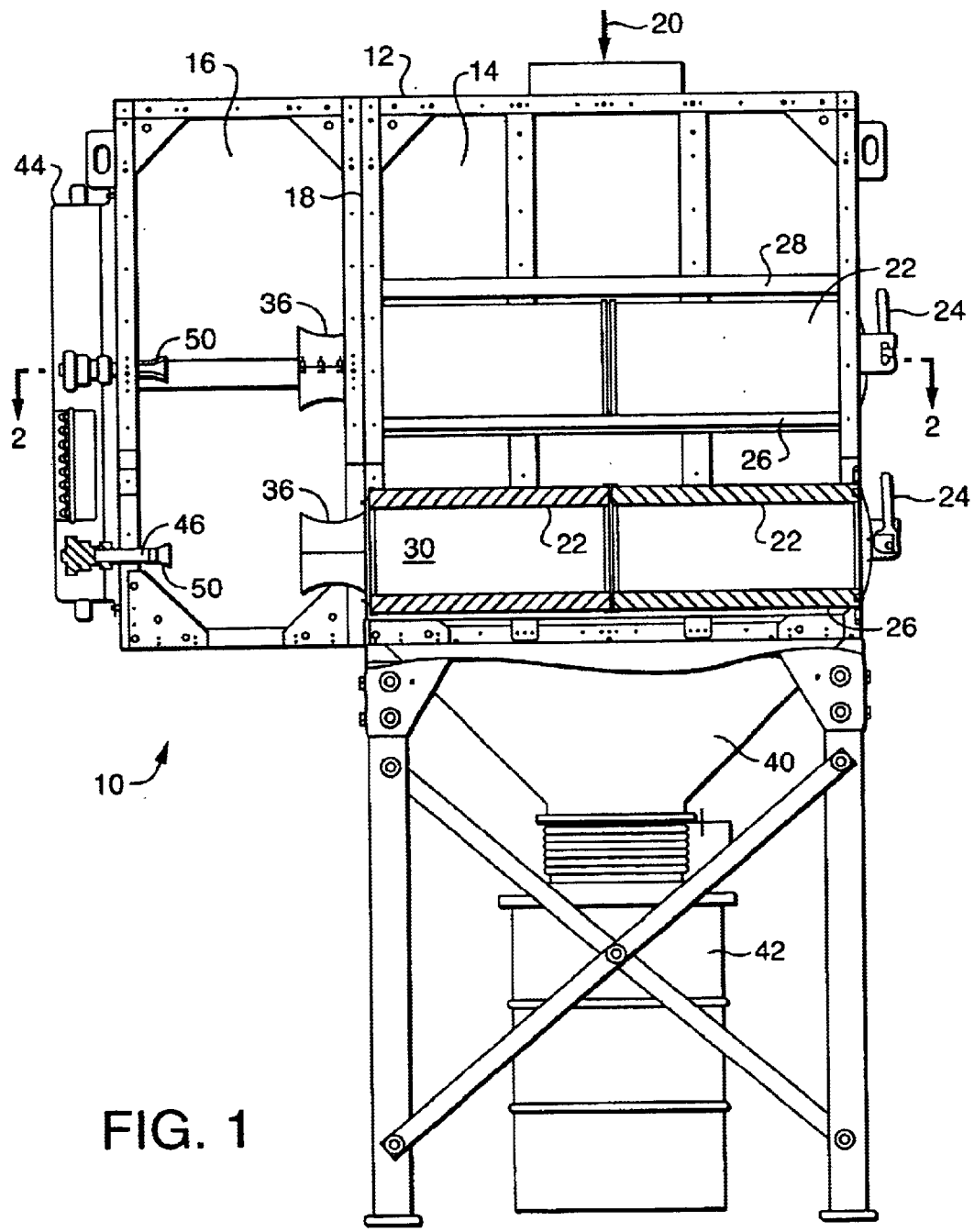
FIG. 1 is a partially cut-away side view of an air filtration system constructed accordingly to a preferred embodiment of the present invention.

Referring now to the various figures of the drawing, and first to FIG. 1, therein is shown at 10 a partially cut away side view of an air filtration system according to a preferred embodiment of the present invention. The system includes a housing 12 that is divided into a dirty air chamber 14 and a clean air chamber 16 by a wall 18. The dividing wall 18 is also commonly referred to as a tubesheet. Dirty air enters the housing 12 through an inlet 20. Upon entering the dirty air chamber 14, the velocity of the dirty air drops suddenly due to the sudden increased volume of space it occupies.

Figure 2:
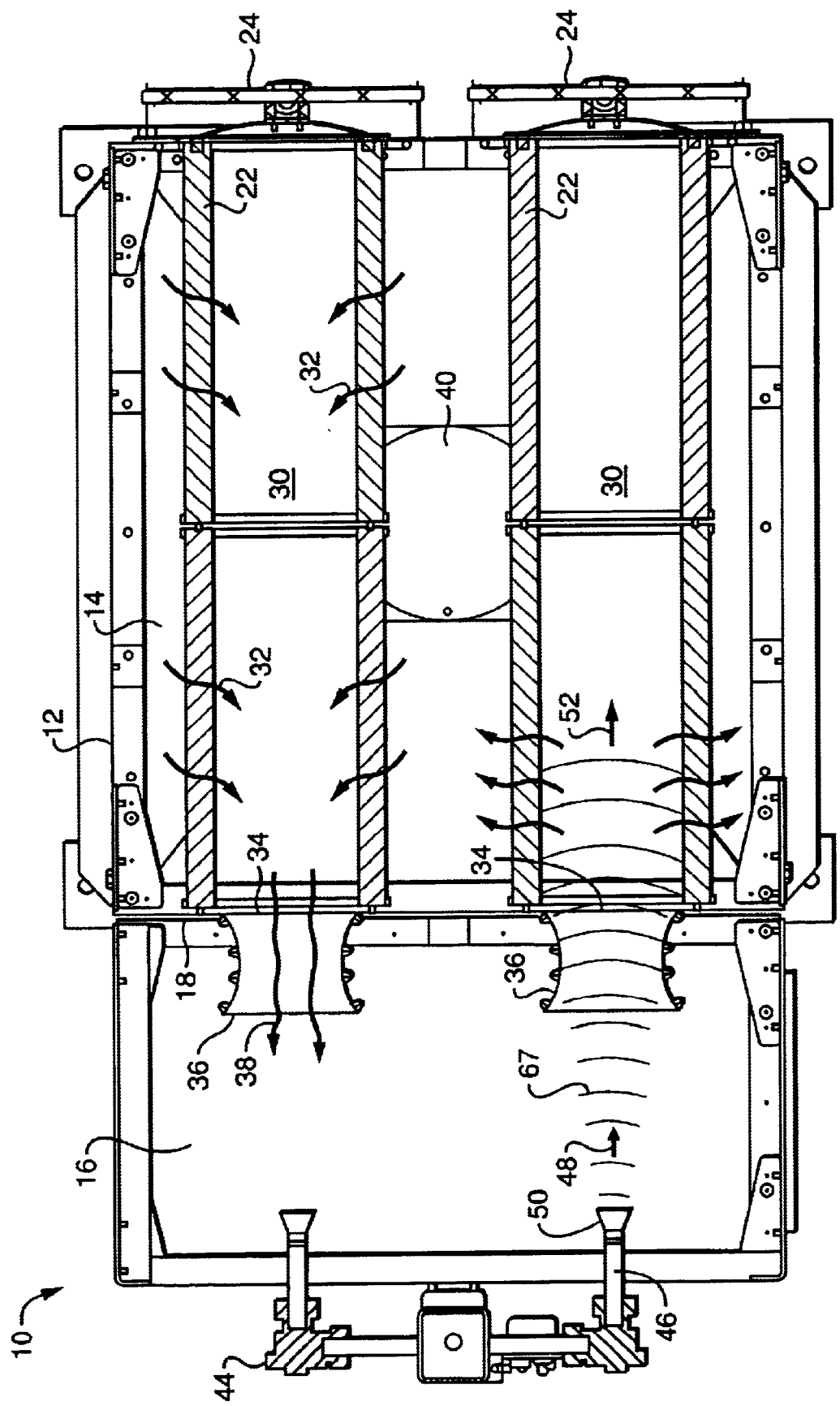
FIG. 2 is a sectional view taken substantially along line 22 of FIG. 1.

Referring now to FIG. 2, it can be seen that the illustrated filtration unit includes four substantially tubular filter media units 22. In the illustrated embodiment, these filtration units 22 are tubular pleated paper cartridges that are axially inserted through a door unit 24. The cartridges are supported by exterior rails 26 and the upper unit 22 is protected from excessive top build up by a shield 28. This construction is well known in the art. If desired, a number of substantially identical filtration units 10 may be ganged together in a side-by-side relationship, also as is well known in the art.

Referring now particularly to FIG. 2, the dust laden dirty air is drawn from the exterior of the filter cartridges 22 to an interior chamber 30. As the air passes through the filter media, particulate matter is caught by the filter media and removed from the air stream 32. The filtered air is then drawn through the interior of the filter cartridge 22 toward an aperture 34 in the tubesheet 18.

Mounted to the tubesheet 18 and projecting into the clean air chamber is a venturi 36. The venturi 36 will be described in greater detail below. Generally, the venturi 36 has an inlet opening which substantially corresponds in size and position to the aperture 34, as well as to the internal dimensions of the filter cartridge 22. Air is drawn through the venturi 36 into the clean air chamber 16, as shown by arrows 38. The clean air is then drawn in a well known manner through an outlet (not shown) in the clean air chamber 16 by a fan (not shown) and is then recirculated or exhausted to the atmosphere.

When filtering large volumes of particulate-laden air, it is well known that the filter media will quickly accumulate significant amounts of debris, restricting or completely blocking air flow through the filter media. It is well known in the art to use a pulse of high velocity, high pressure air in a reverse direction through media in order to physically remove particulate matter that has accumulated thereon. Referring now also to FIG. 1, this "cake" of dust or other particulate matter then falls by gravity into a hopper 40 into a collection reservoir 42 or other removal system (not shown) for disposal or reuse.

Cleaning of the filter elements 22 by a reverse pulse of air is not performed on every filter element 22 simultaneously. Instead, only one or a small portion of the filter elements are cleaned by a reverse flow of air at any given time. This causes the cleaning to be more effective and efficient because only a portion of the forward flow of air being filtered is blocked at any time.

A mechanism or electronically controlled device 44 of well known construction is provided to selectively release a short burst of high pressure, high velocity air through a selected blowpipe 46. In preferred form, the air is delivered from the blowpipe 46 at about 85 to 150 psi Also in preferred form, the burst of air has a duration of only about 100 msec.

Referring first to the lower half of FIG. 2, therein is schematically depicted the manner in which a short burst of high pressure, high velocity air (at 48) is delivered from a blowpipe 46 through a nozzle 50 and into a venturi 36. The pulse of air chokes off all forward flow through the throat of the venturi 36 and delivers a wave (at 52) of high velocity air along the length of the filter cartridge 22. The burst of high velocity air travels in a wave to the opposite end of the tubular filter cartridge where it is reflected back in a manner which causes the filter media to be cleaned in a series of two or three shock pulses during the brief (about 100 msec) burst of air delivered from the blowpipe 46.

Figure 3:
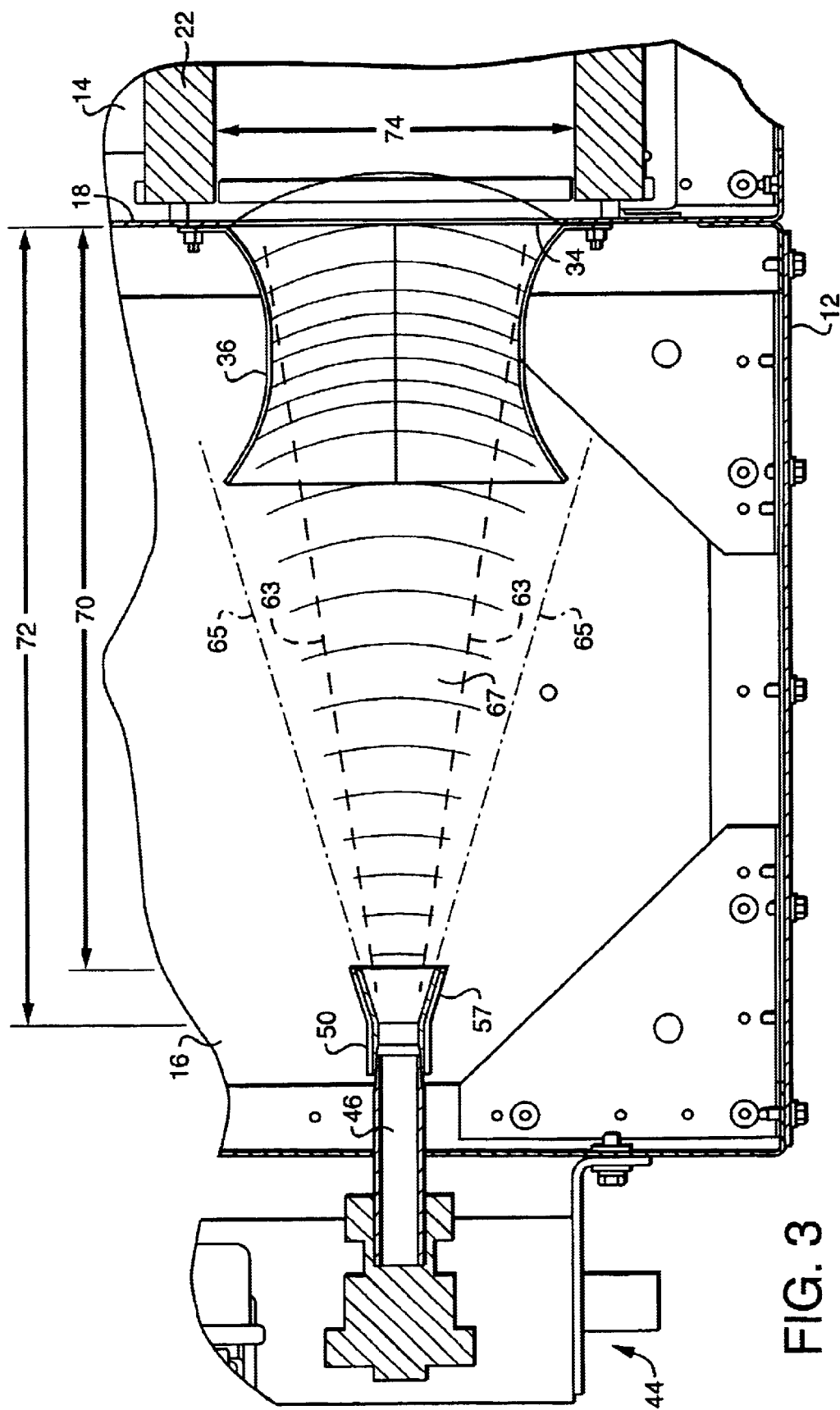
FIG. 3 is an enlarged partial view illustrating properties of a preferred embodiment of a reverse flow filter cleaning apparatus and method according to a preferred embodiment of the present invention.
Figure 4:
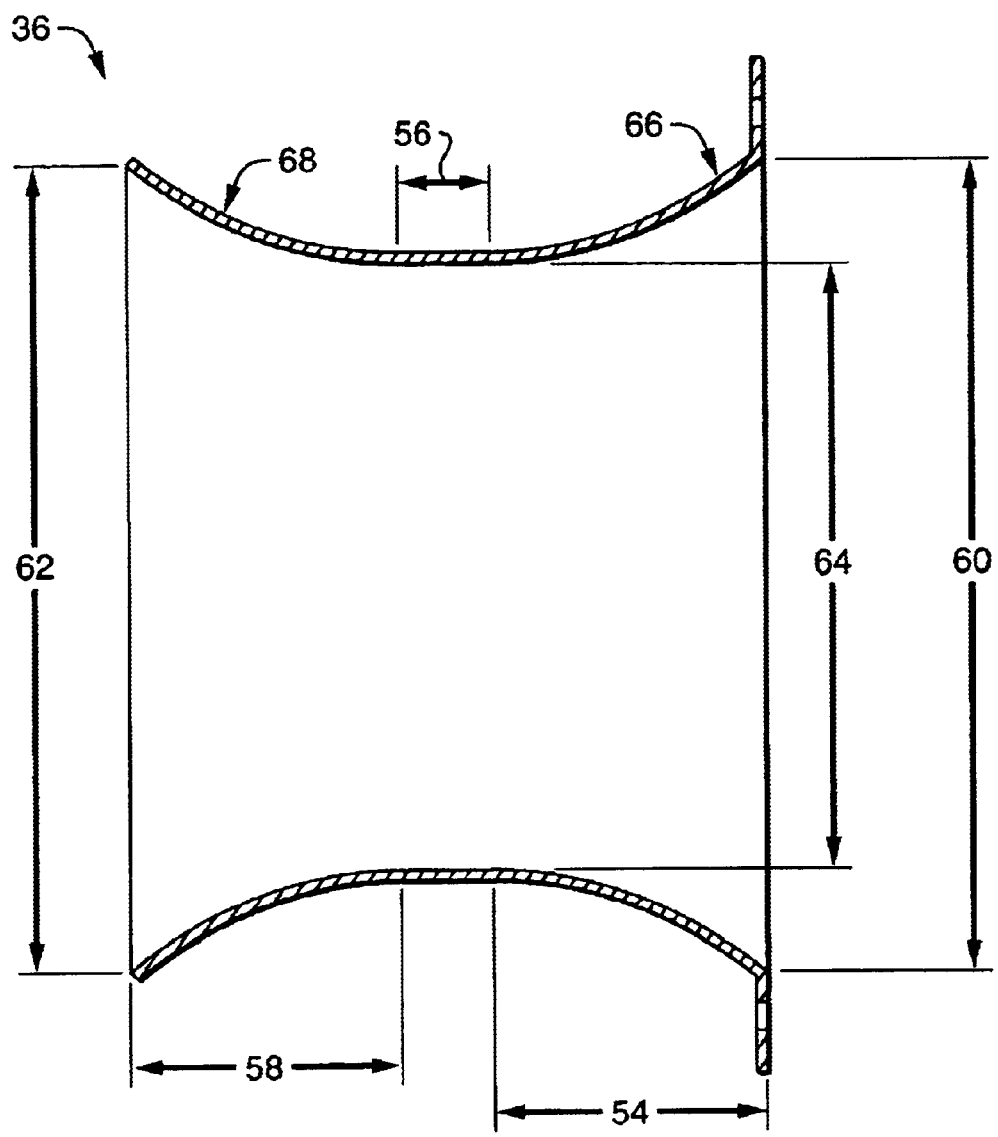
FIG. 4 is an enlarged sectional view of a venturi constructed according to a preferred embodiment of the present invention.

FIGS. 3–6 depict in detail a preferred embodiment of an apparatus for carrying out the present invention and method for the same. Referring now specifically to FIG. 4, therein is shown a preferred design of a venturi for use with the present invention. The venturi 36 has an inlet portion 54, a throat portion 56 and an outlet portion 58. The inlet portion 54 has an inlet opening 60 which substantially corresponds to the diameter or dimension of the aperture 34 in the tubesheet 18. The outlet portion 58 has an outlet mouth or opening 62. The throat portion 56 defines the narrowest diameter 64 of the venturi 36. The terms "inlet" and "outlet" are used in reference to the normal forward flow of air as it is being drawn from the interior chamber 30 of the filter cartridge 22, through the venturi 36 and into the clean air chamber 16. Consistent use of the "inlet" and "outlet" terminology will be used to describe portions of the venturi 36 even when the reverse flow cleaning pulse of air sequence is being described.

The general nature, uses, and effect of venturis are well known in the art. A wide variety of shapes and dimensions may be selected in order to accomplish a particular task. According to a preferred embodiment of the present invention, the inlet opening 60 and outlet opening 62 may be substantially the same diameter. The narrowed throat portion 56 may be of substantially uniform diameter along its axial length such that opposite sides are substantially parallel and straight. Both the inlet portion 54 and the outlet portion 58 may be appropriately angled or contoured, such as along a defined radius 66, 68, respectively. Preferred dimensions of a venturi 36 for use with the present invention will be described in which the tubesheet aperture 34 and inlet opening 60 are both approximately 9 inches in diameter. As shown, the diameter 64 of the throat portion 56 is approximately 6.75 inches. The axial length of the inlet portion 54 and outlet portion 58 are each approximately 3 inches. The axial length of the throat portion 56 is 1 inch. The radii 66, 68 of both the inlet and outlet portions 54, 58 is approximately 4.4375 inches.

Figure 5:
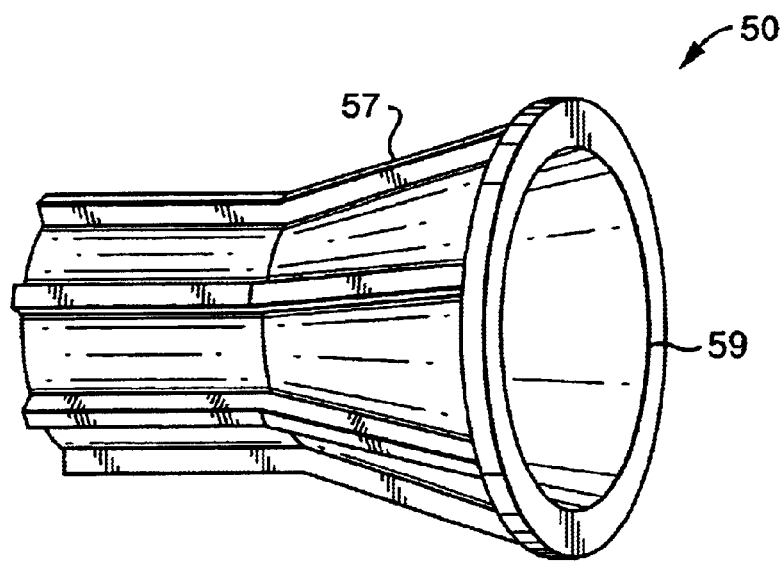
FIG. 5 is a pictorial view of a blowpipe nozzle constructed according to a preferred embodiment of the present invention.
Figure 6:
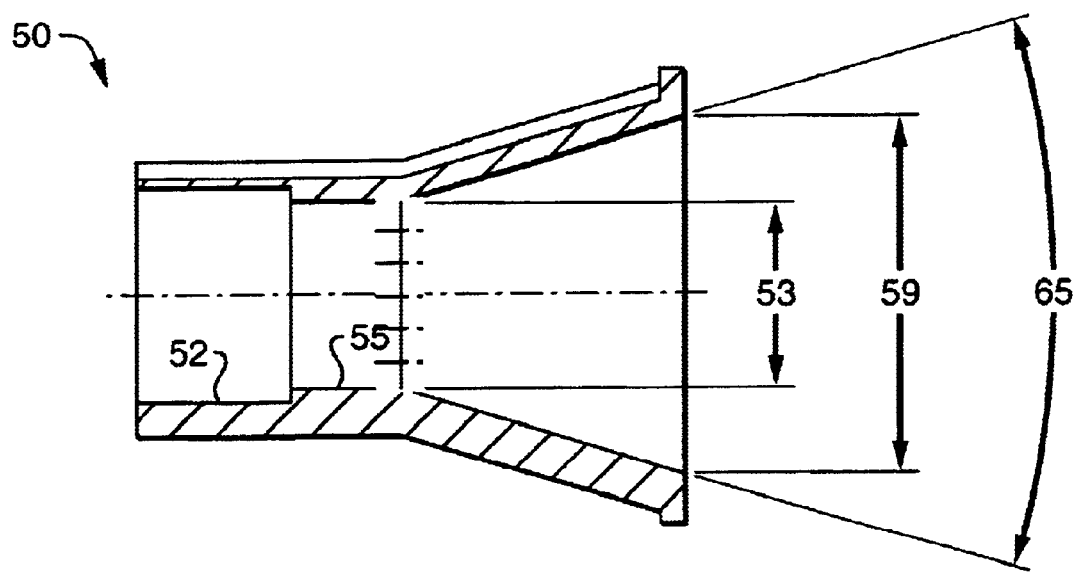
FIG. 6 is a longitudinal sectional view of the nozzle shown in FIG. 5.

Referring now to FIGS. 5 and 6, therein is shown at 50, a preferred construction of a blowpipe nozzle according to a preferred embodiment of the present invention. The nozzle 50 may be made of metal or plastic. The nozzle 50 may be mounted on the end of a blowpipe 46 such as by interior threads 52 which engage exterior threads on the blowpipe 46. The inside diameter 53 of the throat portion 55 of the nozzle 50 should correspond to the inside diameter of the blowpipe 46 and, for example, may be 1 inch. A bell portion 57 extends axially a distance sufficient to modify the shape of a high velocity air pulse, as will be described in greater detail below. The bell portion 57 may have a mouth opening 59 of approximately 1.98 inches in diameter. For these given nozzle and venturi dimensions, the distance 70 from the tubesheet to the end of the nozzle would preferably be 20.25 inches.

Referring now also to FIG. 3, therein is schematically illustrated the effect that a nozzle, according to the present invention, has on a pulse of air delivered from a blowpipe 46 to the venturi 36. As illustrated by dashed lines 63, a pulse of air emitted from an unmodified blowpipe opening will tend to diverge at an included angle of approximately 15° to 18°. By providing the bell portion 57 of the nozzle 50 with a flare that exceeds this angle, the pulse of air is forced to diverge at a greater angle, thus entraining ambient air. In preferred form, the substantially conical (or frustoconical) bell portion 57 of the nozzle 50 diverges at an included angle 65 of approximately 34° An extension of this angle is schematically illustrated by dashed line 65 in FIG. 3. Because of the entrainment of ambient air in the somewhat conical pulse of air emitted from the nozzle, the actual angle of divergence will fall between the unmodified angle 63 and the nozzle's angle of divergence 65. This actual angle of divergence is illustrated by a series of wave lines 67 in FIGS. 2 and 3. This design causes some of the energy of the air pulse to be used to entrain more air into the stream 67.

Many factors go into selecting the exact combination of relative dimensions of the blowpipe nozzle 50, the venturi 36 and spacing there between. As is illustrated in FIG. 3, the spacing of the blowpipe 46 and/or nozzle 50 are generally measured by their distance from the tubesheet 18. In a preferred embodiment, the inlet opening 60 of the venturi 36 corresponds axially with the aperture 34 in the tubesheet 18. It is possible, however, to design and use a venturi (such as shown in U.S. Pat. Nos. 5,562,746 and 6,090,173) in which the inlet opening extends axially beyond the tubesheet. It is desirable to axially position the blowpipe 46 and nozzle 50 a distance 70 from the tubesheet 18 which is as short as practical without interfering with the normal forward flow of air through the venturi into the clean air chamber 16.

The relative effect of the nozzle design and spacing is schematically illustrated in FIG. 3. Therein it can be seen that at a given axial distance 72, if there were no substantially conical flared bell extension 57 of the nozzle 50, the divergence angle 62 of the air pulse would be inadequate to completely choke the throat 56 of the venturi 36. Likewise, if the air pulse were to diverge at the same angle of divergence 65 of the nozzle 50, it can be seen by angle lines 65 that the pulse of air would exceed the mouth of the outlet opening 62 of the venturi 36, resulting in an inefficient waste of energy. Instead, the distance 70 between the nozzle outlet and tubesheet 18 is kept at a minimum and an angle 65 of the nozzle 50 which exceeds the angle at which an air pulse would ordinarily diverge without modification will cause the pulse of the high velocity air (illustrated by wave lines 67) to be wider than the opening 64 of the throat portion 56 while being smaller than the outlet opening 62 of the outlet portion 58. In other words, the axial distance between the tubesheet 18 and blowpipe/nozzle 46, 50 is minimized by using a flared nozzle which forces the pulse of high velocity air to diverge and to have outer boundaries that strike the venturi 36 at a point in the outlet portion 58 between the throat portion 56 and outlet opening 62. The converging nature of the outlet portion 58 (in reverse flow) provides a slightly enlarged target for the reverse flow air pulse 67 while assuring that the throat 56 of the venturi 36 is fully choked during the reverse flow cleaning process. As previously discussed, it is important to fully choke the throat of the venturi for a maximized time during the reverse flow cleaning process so that multiple waves of the high pressure, high velocity pulse may travel substantially the entire length of the tubular filter media 22 (usually multiple times) during the brief duration of the cleaning pulse. This achieves the goal of sustaining the back pressure within the filter 22 during the cleaning pulse.

In practice, the most difficult region along the length of the tubular filter media 22 to clean is the end nearest the tubesheet aperture 34. This challenge can be accomplished with efficiency if a pulse of reverse flow air is properly delivered at the correct point into a venturi in which the inlet opening is sized to substantially correspond with an interior dimension 74 of the tubular filter media 22. The axial spacing between the tubesheet/venturi and blowpipe outlet may be minimized through the use of the above-described blowpipe nozzle, having an angle which exceeds a normal angle of divergence and selected to deliver a high velocity pulse of air at a diameter greater than the venturi throat but less than the venturi opening. This combination allows the present invention to operate with increased backflow cleaning results while at the same time maximizing the efficiency of the jet pulse delivery subsystem and minimizing the dimensional requirements of the clean air chamber.

Figure 7:
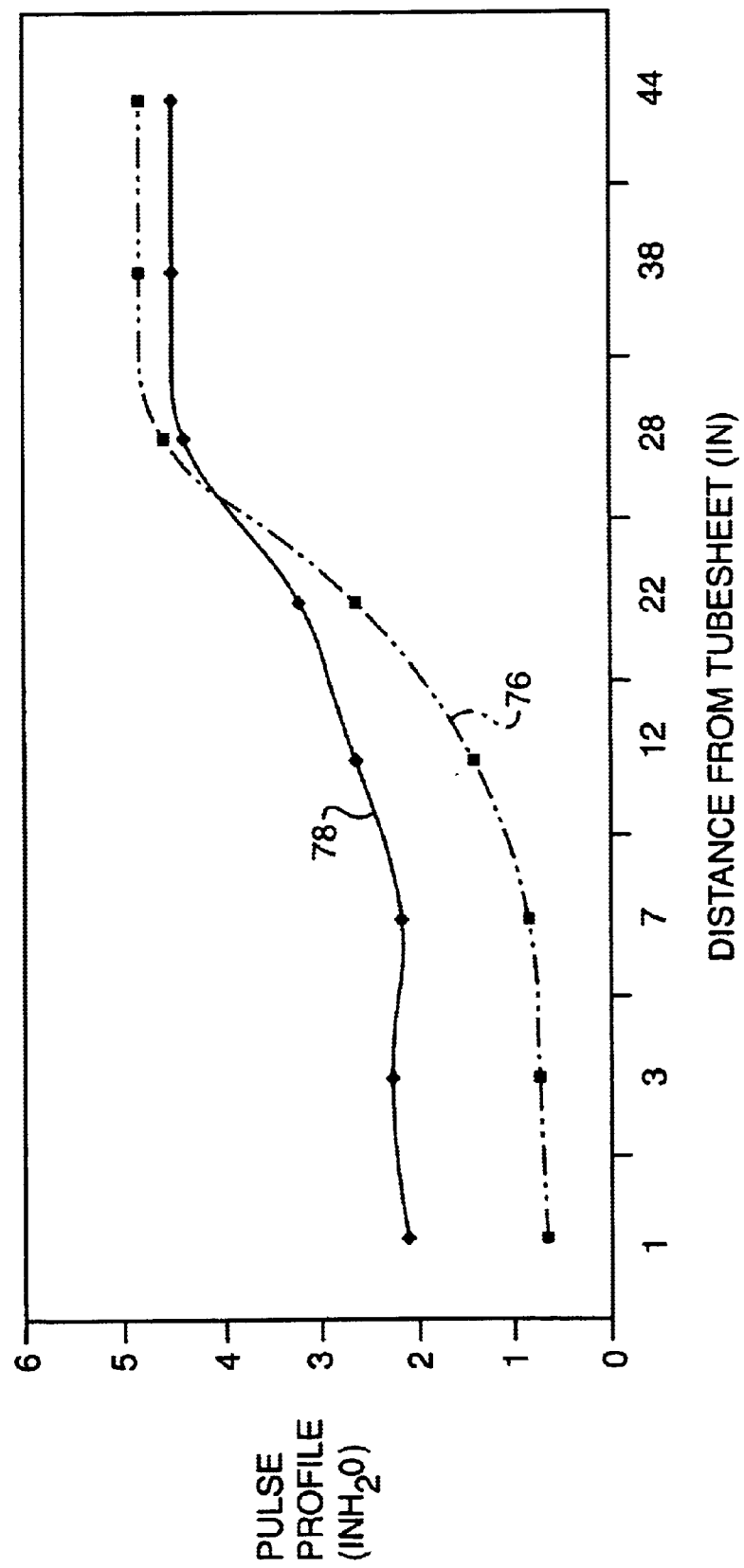
FIG. 7 is a graph depicting the reverse flow pulse profile of an apparatus constructed according to a preferred embodiment of the present invention.

Referring now to FIG. 7, it can be seen that the pulse pressure profile, measured in inches of water, along the length of a tubular filter cartridge is significantly enhanced and made significantly more uniform (flat). The graph of FIG. 7 shows at the broken line curve 76 the reverse flow pressure achieved if a nozzle according to the present invention is not used. Solid line 78 shows the enhanced pulse profile achieved when a nozzle, according to the present invention, is used at the same relative axial distance from the tubesheet and with identical venturis. The graph of FIG. 7 shows that the pulse profile is particularly enhanced at the end of the filter media closest to the tubesheet, where adequate backflow pressure is most difficult to achieve. At the distal end of the tubular filter media, an insignificant amount of backflow pressure is sacrificed. The overall effect, however, is positive because a more uniform reverse flow of cleaning air is provided along substantially the entire length of the filter media. In other words, the increased level of backflow cleaning pressure is balanced with the desire for uniformity.

The embodiment shown is that which is presently preferred by the inventors. Many variations in the construction or implementation of this invention can be made without substantially departing from the spirit and scope of the invention. For this reason, the embodiment illustrated and described above is not to be considered limitive, but illustrative only. The scope of patent rights are to be limited only by the following claim or claims interpreted according to accepted doctrines of claim interpretation, including the doctrine of equivalents and reversal of parts.

What we claim is:

1. An air filter assembly, comprising:
    a housing including an air inlet and an air outlet, said housing including a wall separating the housing into a filtering chamber and a clean air chamber, said wall including at least one air flow aperture therethrough;
    an elongated substantially tubular filter element positioned in air flow communication with the air flow aperture at an end of the filter element, said filter element including filter media having an inner dimension defining an inner chamber and said filter element being oriented with the inner chamber in air flow communication with the aperture;
    a reverse flow cleaning system, comprising:
    a venturi element having an inlet portion with an inlet opening, an outlet portion with an outlet opening, and a narrowed throat portion therebetween, said inlet opening substantially corresponding in size with the inner dimension of the filter element and positioned on the housing wall to project into the clean air chamber of the housing;
    a blowpipe for selectively delivering a reverse direction pulse of air having an outlet nozzle and being substantially axially aligned with the outlet opening of the venturi, said nozzle being flared in a substantially conical shape and having an included angle that exceeds an angle at which high pressure air would ordinarily diverge from an unmodified blowpipe opening, said nozzle being axially spaced from the venturi at a selected distance such that a high velocity pulse of air delivered by the blowpipe through the nozzle is delivered to the outlet portion of the venturi substantially between the outlet opening and the throat to effectively completely choke all forward movement of air flow through the venturi and to deliver a pulse wave of high pressure, high velocity air along substantially the full length of the filter element.

2. The assembly of claim 1, wherein said filter element has a substantially round interior cross-sectional shape.

3. The assembly of claim 1, wherein the pulse of air has a duration of about 100 msec.

4. The assembly of claim 1, wherein the reverse direction pulse of air is released at from between approximately 85 psi to approximately 150 psi.

5. The assembly of claim 4, wherein the pulse of air has a duration of about 100 msec.

6. The assembly of claim 1, wherein the venturi throat portion is of substantially uniform diameter along the axial length thereof.

7. The assembly of claim 6, wherein the inlet and outlet portions of the venturi element are contoured along a substantially uniform radius.

8. The assembly of claim 1, wherein the included angle at which air would ordinarily diverge from an unmodified opening is from between about 15° and about 18°.

9. The assembly of claim 1, wherein the nozzle is flared at an included angle of about 34°.

10. The assembly of claim 9, wherein the included angle at which air would ordinarily diverge from an unmodified opening is from between about 15° and about 18°.

11. The method of cleaning a filter element, comprising:

discharging a quantity of pressurized air from a blowpipe axially aligned with and spaced from a venturi element;

said venturi element having an inlet portion with an inlet opening, an outlet portion with an outlet opening, and a narrowed throat portion therebetween, said inlet opening substantially corresponding in size with and air flow communication with the interior of an elongated substantially tubular filter element;

said blowpipe having an outlet nozzle flared in a substantially conical shape and having an included angle that exceeds an angle at which high pressure air would ordinarily diverge from an unmodified blowpipe opening and said nozzle being axially spaced from the venturi at a selected distance such that the pressurized air discharged by the blowpipe through the nozzle is delivered to the outlet portion of the venturi substantially between the outlet opening and the throat to effectively completely choke all forward movement of air flow through the venturi and to deliver a pulse wave of high pressure, high velocity air along substantially the full length of the filter element.

12. The method of of claim 11, wherein the discharge of pressurized air has a duration of about 100 msec.

13. The method of claim 11, wherein the pressurized air is discharged at from about 85 psi to about 150 psi.

14. The method of claim 11, wherein the nozzle is flared at an included angle of about 34°.

15. The method of claim 11, wherein the included angle at which air would ordinarily diverge from an unmodified opening is from between about 15° and about 18°.

* * * * *